(12) United States Patent
Greenfield et al.

(10) Patent No.: US 11,597,310 B2
(45) Date of Patent: Mar. 7, 2023

(54) SYSTEMS AND METHODS FOR FORMING A STRUCTURE FROM A TRAILER BODY

(71) Applicant: Affordable Food Cart Rentals LLC, Tigard, OR (US)

(72) Inventors: James R. Greenfield, Tigard, OR (US); Samuel Lauderdale, Happy Valley, OR (US)

(73) Assignee: AFFORDABLE FOOD CART RENTALS LLC, Tigard, OR (US)

( * ) Notice: Subject to any disclaimer, the term of this patent is extended or adjusted under 35 U.S.C. 154(b) by 322 days.

(21) Appl. No.: 16/751,007

(22) Filed: Jan. 23, 2020

(65) Prior Publication Data

US 2020/0238886 A1     Jul. 30, 2020

Related U.S. Application Data

(60) Provisional application No. 62/797,508, filed on Jan. 28, 2019.

(51) Int. Cl.
*B60P 3/025* (2006.01)
*F24C 15/20* (2006.01)

(52) U.S. Cl.
CPC ....... B60P 3/0257 (2013.01); *B60Y 2200/147* (2013.01); *B60Y 2200/148* (2013.01); *F24C 15/2042* (2013.01)

(58) Field of Classification Search
CPC ............. B60P 3/0257; B60Y 2200/148; B60Y 2200/0147; B62D 65/00
USPC ..................................... 296/22, 24.33, 26.08
See application file for complete search history.

(56) References Cited

U.S. PATENT DOCUMENTS

| | | | | |
|---|---|---|---|---|
| 3,495,865 A | * | 2/1970 | James | B60P 3/0257 296/168 |
| 4,535,933 A | * | 8/1985 | Kuiper | B60P 3/341 296/26.02 |
| 4,601,509 A | * | 7/1986 | Ellis, Sr. | B60P 3/0257 296/22 |
| 5,285,604 A | * | 2/1994 | Carlin | E04H 1/1205 52/36.2 |
| 5,833,295 A | * | 11/1998 | Farlow, Jr. | B60P 3/14 296/22 |

(Continued)

FOREIGN PATENT DOCUMENTS

| | | | | |
|---|---|---|---|---|
| KR | 970074598 A | * | 12/1997 | B65D 88/74 |
| KR | 101593819 B1 | * | 2/2016 | B60P 3/32 |
| WO | WO-2017095226 A1 | * | 6/2017 | B62D 33/04 |

OTHER PUBLICATIONS

Machine translation KR 970074598.*

*Primary Examiner* — D Glenn Dayoan
*Assistant Examiner* — Kevin P Weldon
(74) *Attorney, Agent, or Firm* — Summit Patents PC

(57) ABSTRACT

Systems and method of forming a structure from a trailer body are disclosed herein. An example structure can be formed from a portion/section of a trailer, such as a semi-truck, or dry-van, trailer. The trailer has a unibody construction allowing the section(s) cut/formed therefrom to be self-supporting. The self-supporting sections can be enclosed on one or more open ends, i.e. the ends formed by cutting or sectioning the trailer, to enclose the section. The enclosed section can then be outfitted/equipped, as needed, to form the complete structure.

21 Claims, 6 Drawing Sheets

(56) References Cited

U.S. PATENT DOCUMENTS

| | | | |
|---|---|---|---|
| 6,202,434 B1 * | 3/2001 | Hearne, Jr. ............ | A23B 4/068 62/304 |
| 6,345,852 B1 * | 2/2002 | McCarthy ............ | B60P 3/0257 296/22 |
| 8,141,304 B2 * | 3/2012 | Shen ..................... | E04B 1/3444 52/645 |
| 2011/0138820 A1 * | 6/2011 | Weeth .................... | F25D 15/00 62/380 |

* cited by examiner

SYSTEMS AND METHODS FOR FORMING A STRUCTURE FROM A TRAILER BODY

CROSS-REFERENCE TO RELATED APPLICATIONS

This application claims the benefit of U.S. Provisional Patent Application Ser. No. 62/797,508, filed Jan. 28, 2019, the contents of which are herein incorporated by reference in their entirety.

BACKGROUND

Food carts are quickly becoming a common sight in many cities and provide an economical means of entering the food service industry. Rather than opening a physical location, which can be prohibitively expensive, many restauranteurs can start with a food cart having a much lower entry price. Typically, food carts are towable structures, which allows the food cart to be moved as needed, unlike food trucks, which are motorized and self-driving. Food carts are a popular option over food trucks as they do not include the added expense of a powertrain and engine. Typically, these food carts are constructed from new trailers, such as towable storage trailers, or from new box-van bodies that are mounted to a frame and wheels. While the price of a food cart is low compared to a physical location, food carts are still expensive since the trailer or body must first be purchased and then outfitted/equipped, which can be a considerable expense. There exists a need for food carts constructed in a more cost-effective manner, efficient manner, or both.

DETAILED DESCRIPTION OF THE EMBODIMENTS

Figure 1:
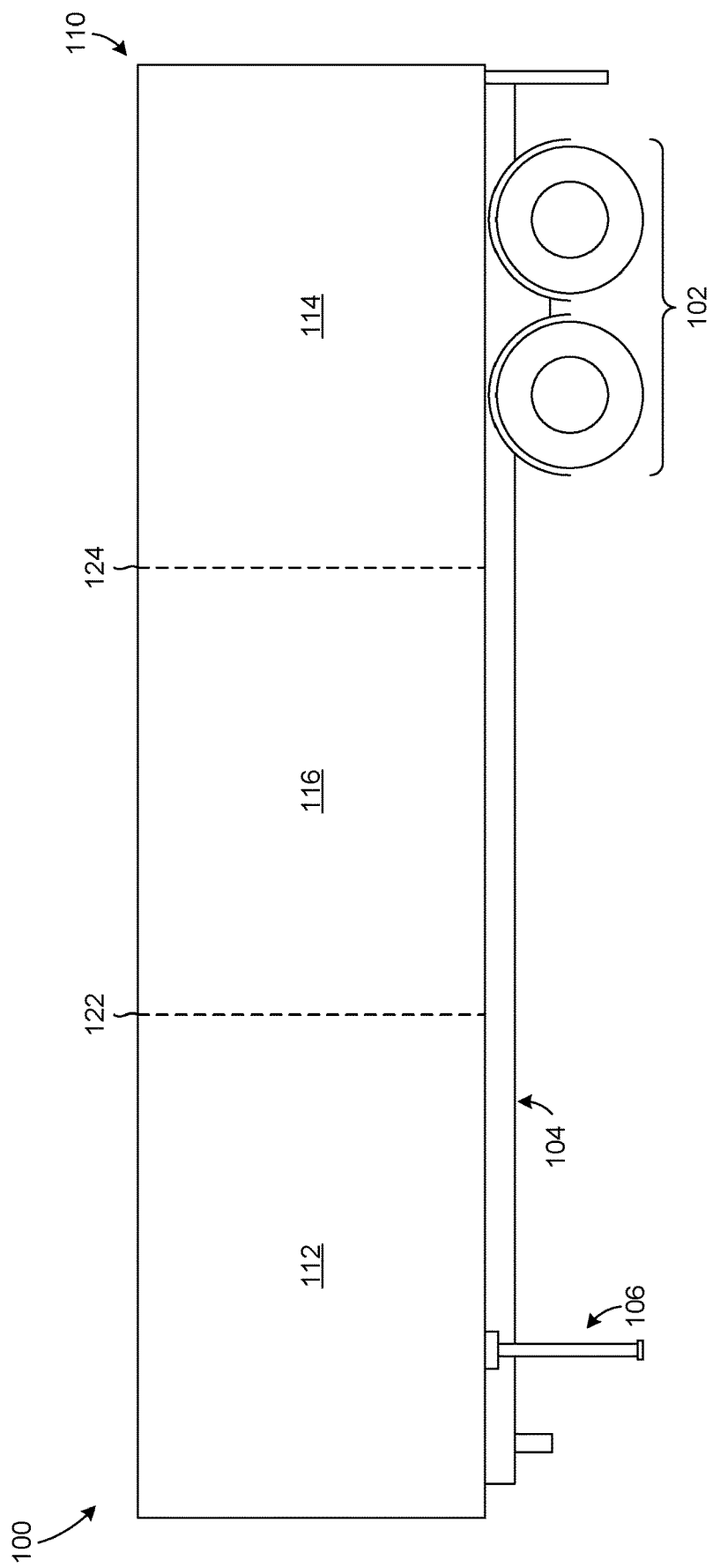
FIG. 1 illustrates an example trailer.

Systems and method of forming a structure from a trailer body are disclosed herein. An example structure can be formed from a portion/section of a trailer, such as a semi-truck, or dry-van, trailer. The trailer has a unibody construction allowing the section(s) cut/formed therefrom to be self-supporting. The self-supporting sections can be enclosed on one or more open ends, i.e. the ends formed by cutting or sectioning the trailer, to enclose the section. The enclosed section can then be outfitted/equipped, as needed, to form the complete structure.

In an example, a structure, such as food cart can be formed using the disclosed systems, methods, or combinations thereof. A trailer can be cut to form a section having a desired/required length necessary for the food cart. This cut section can include a front end of the trailer which is already enclosed, so that the only open/unenclosed end of the cut section is the portion along the cut-line. From the remaining section(s) of the trailer, panels can be cut or formed, and used to enclose the open end of the food-cart section. In this way, the structure can be formed from mainly elements/materials of the original trailer. This allows used trailers to be recycled/converted, reducing waste and cost of disposing of used trailers and providing a reduced cost material source for forming structures, such as the food cart.

Prior, or after, the section has been enclosed, the section can be equipped/outfitted. The equipping/outfitting of the section can include installing various fixtures/elements to facilitate the use of the completed structure formed by the section. For example, cooking equipment, food preparation equipment, and plumbing fixtures can be installed within a section that will become a food cart upon completion. As part of this process, various external connections can also be installed on the exterior of the section to allow the completed structure to be connected to various external elements, such as utilities. For purposes of this disclosure, "cooking equipment" and "food preparation equipment" are not intended to include utensils used to prepare food or cook food (e.g., knives, forks, spoons, spatulas, tongs, pots, pans, etc.). Rather, "cooking equipment" and "food preparation equipment" are intended to include equipment to change or maintain the physical properties of the food, such as an oven, a microwave, a refrigerator, a freezer, a bain marie (e.g., warm or cold), a warming table (e.g., electric or water bath), or the like.

To allow the section to be mobile, a wheel set and trailer tongue can be attached directly to the section. As with the original trailer from which the section was cut, the section too is a self-supporting structure. That is, the section does not require additional framework, internally or externally, to support itself. In contrast, the body of an integrated trailer frame and body, typical of most enclosed trailers, is not a self-supporting structure and would collapse or have reduced structural rigidity when separated from the trailer. Since the section is self-supporting, the wheels and axles can be affixed directly to the section without the need for an additional structure to which the wheel set(s) are affixed. Alternatively, the section can be mounted, permanently or temporarily, to a transport, such as a trailer or frame and wheel-set. This allows the section/completed structure to be mobile so that it can be moved to a permanent or temporary location. In the example of the food cart, a frame, wheel-set and trailer tongue can be attached to the section to allow the food cart to be towed to various locations. In one example, the transport can be a vehicle, such as a pickup truck, a flatbed truck, a van, or the like, capable of supporting and moving the section from place to place.

The self-supporting structure differs from a food truck in which the entire truck frame is integrated into the frame and wheel set of the vehicle and is not separable from the wheel set. Food trucks require increased storage space, more complex maintenance protocols, and decreased interchangeability compared with self-supporting food carts. For example, if a food truck suffers a vehicle maintenance issue unrelated to the food processing operations, the entire vehicle becomes unusable until the maintenance issue is fixed. Instead, a self-supporting structure could be simply detached from a vehicle needing maintenance and reattached to another operational vehicle for continued use. Also, when detached from its vehicle, the self-supporting structure could be stored in smaller space than a food truck.

Various other features necessary to, or desired for, the final use of the section can also be formed/installed. For example, cut-outs can be formed to allow openings/elements, such as doors and windows to be installed within the section. Some openings/elements, such as a door, can be pre-existing in the trailer and included within the section for use in the completed structure.

The completed structure formed from the section of the trailer is enclosed and protected from the external environment. The open interior of the section allows for various uses of the section once complete. As previously discussed, structures, such as a food cart, can be formed from the section. Other example structures can include storage units, other structures, or combinations thereof that can be mobile, permanently located or semi-permanently located.

The use of a self-supporting trailer body for forming the section allows for reduced manufacturing cost. Typically, trailers are constructed beginning with a frame onto which the trailer is built, with the completed trailer being an integration of the frame and body. This integration prevents frame and body from being separable into independent elements. In contrast, constructing/forming the section from a self-supporting trailer body allows each section to be similarly self-supporting. This means that the section does not require additional framework to be added. The self-supporting nature of the section allows wheels, axles and other elements to be affixed directly to the section. Additionally, the section can be mounted onto other structures, such as a trailer, but does not require such a structure for the integrity of the section and the section can remain separable from the trailer if a user or other wishes to do so.

FIG. 1 illustrates an example trailer 100, such as a semi-trailer, that can be processed to form one or more structures. The trailer 100 can include a wheel set 102, a frame 104, supports 106 and a body 110. To prepare the trailer 100 for sectioning, or cutting, the body 110 can be separated from the other components. The body 110 is self-supporting, that is, the body 110 does not require an external support/framework to maintain shape, integrity, or combinations thereof. The self-supporting nature of the body 110 allows the body 110 to be separated from the various components, maintain its shape/rigidity, and allow it to be cut into sections, such as 112, 114, and 116, that are also self-supported.

Figure 2A:
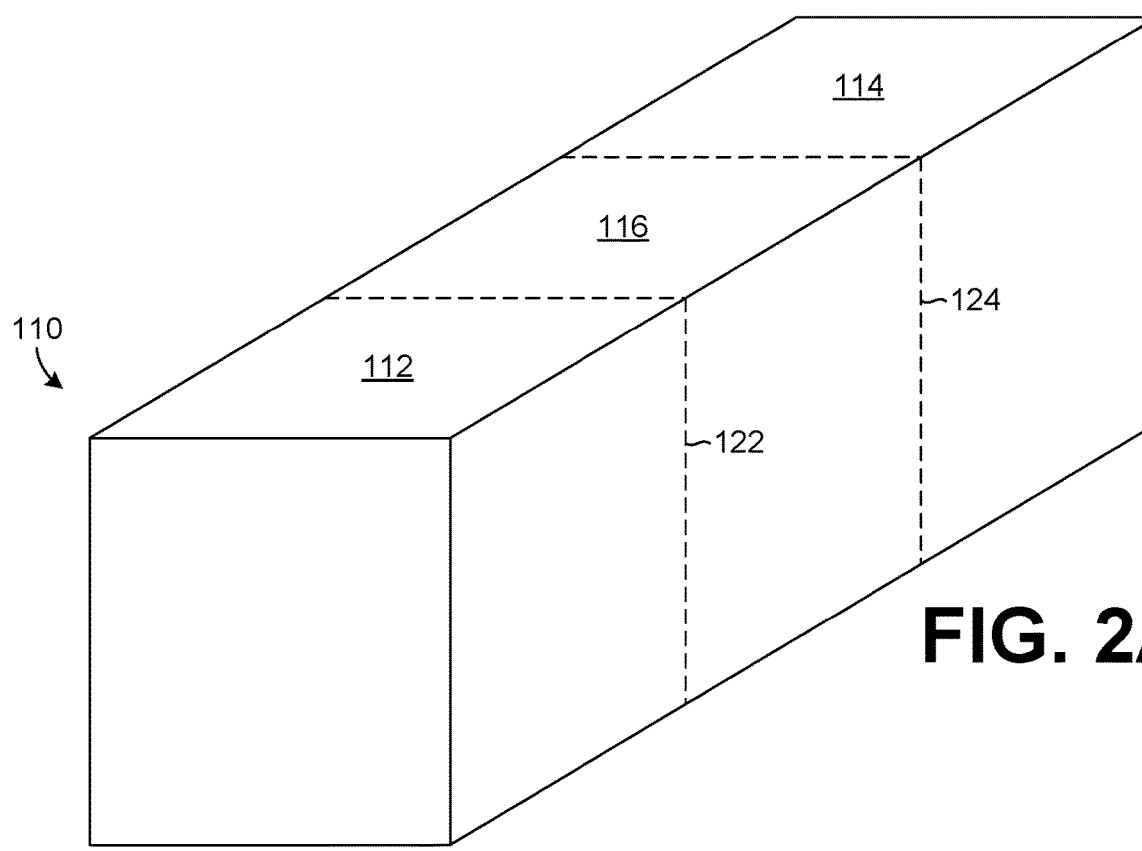
FIGS. 2A and 2B illustrate sectioning of an example trailer.

FIG. 2A shows the body 110 with the other components of the trailer 100 removed therefrom. The body 110 can be sectioned, or cut, along lines 122, 124 to form multiple sections, such as 112, 114 and 116. While the body 110 is shown as sectioned into three sections, the number of sections formed from the body 110 is an optional amount and can be based on the desired size of one or more of the sections. Each of the sections 112, 114, 116, formed from the body 110, are self-supporting and do not require additional framework or structure to be attached in order to retain/maintain the structural integrity of the section. Optionally, additional framework or structure can be installed within the section, such as to support the future use of the section. That is, structural modifications of the section, such as the inclusion of additional structural support, can be performed to allow the section to be used as intended, for equipment to be installed within the section, or a combinations thereof.

Figure 2B:
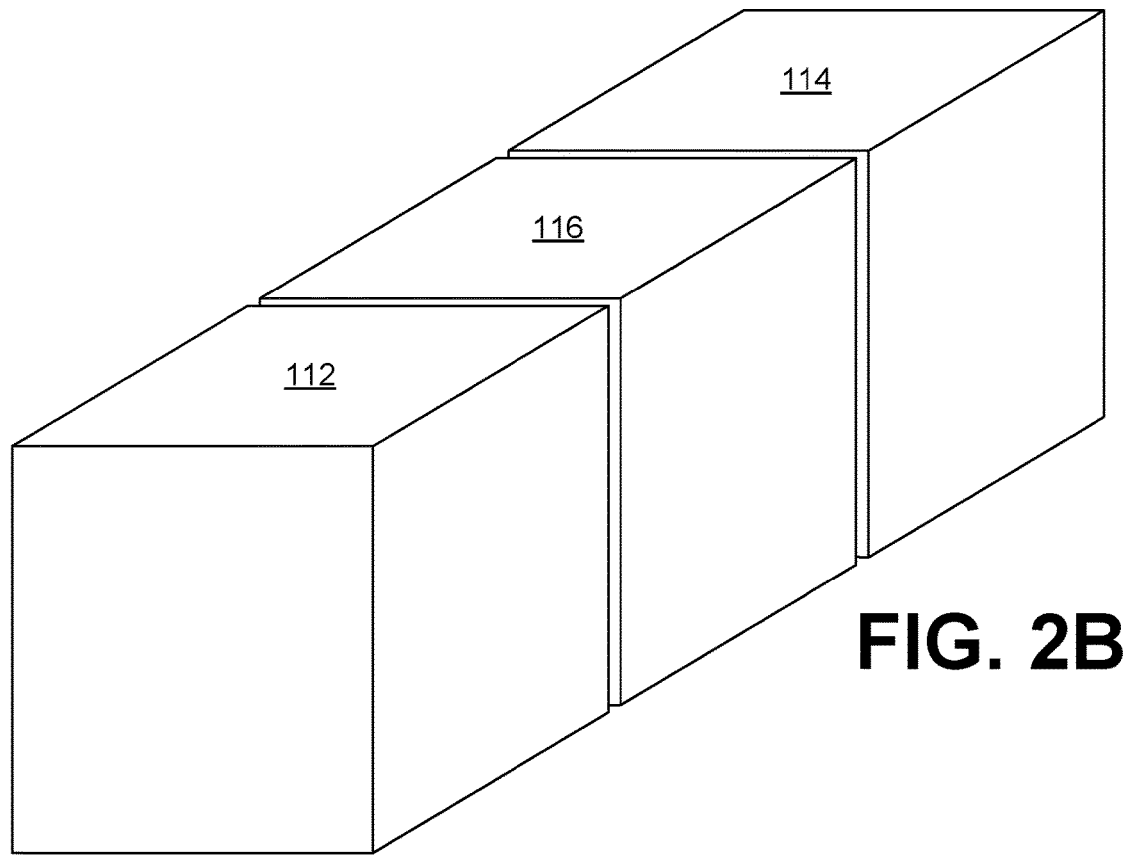

FIG. 2B shows the body 110 divided into the separate sections 112, 114, and 116. The sections 112, 114, and 116 have one or more open, unenclosed ends due to the sectioning along the lines 122, 124. The open ends of one or more of the sections 112, 114, 116 can be enclosed to form one or more enclosed structures that can then be used for a variety of purposes, including economic ventures such as the preparation of food, sale of food, or combinations thereof.

Figure 3:
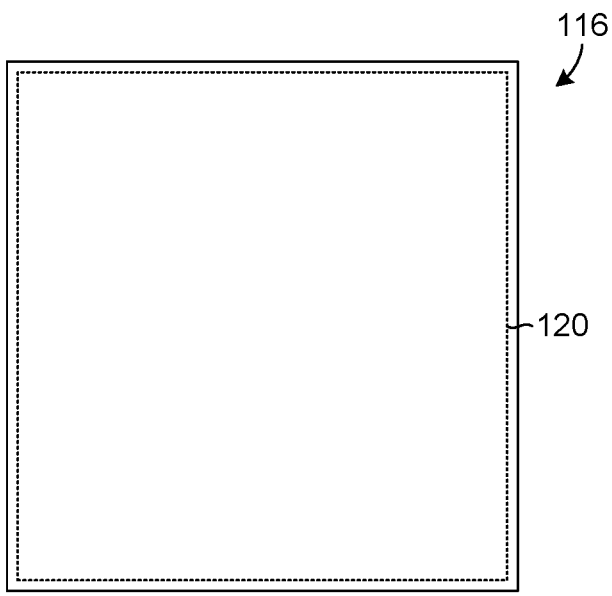
FIG. 3 illustrates a side view of a section of the example trailer.

FIG. 3 illustrates a side of the middle section, section 116, of the sectioned body 110. In an example, section 116 can be enclosed on both open ends to form an enclosed structure. In a further example, the section 116 can be further cut to form panels, such as 120, for use in enclosing the other sections 112, 114. The panel 120 can be cut from the section 116 and applied to the open end of one of the other sections, sections 112, 114, to enclose them. By forming one or more panels 120 from the section 116, the need for additional materials to enclose the other sections is reduced, or minimized.

Figure 4:
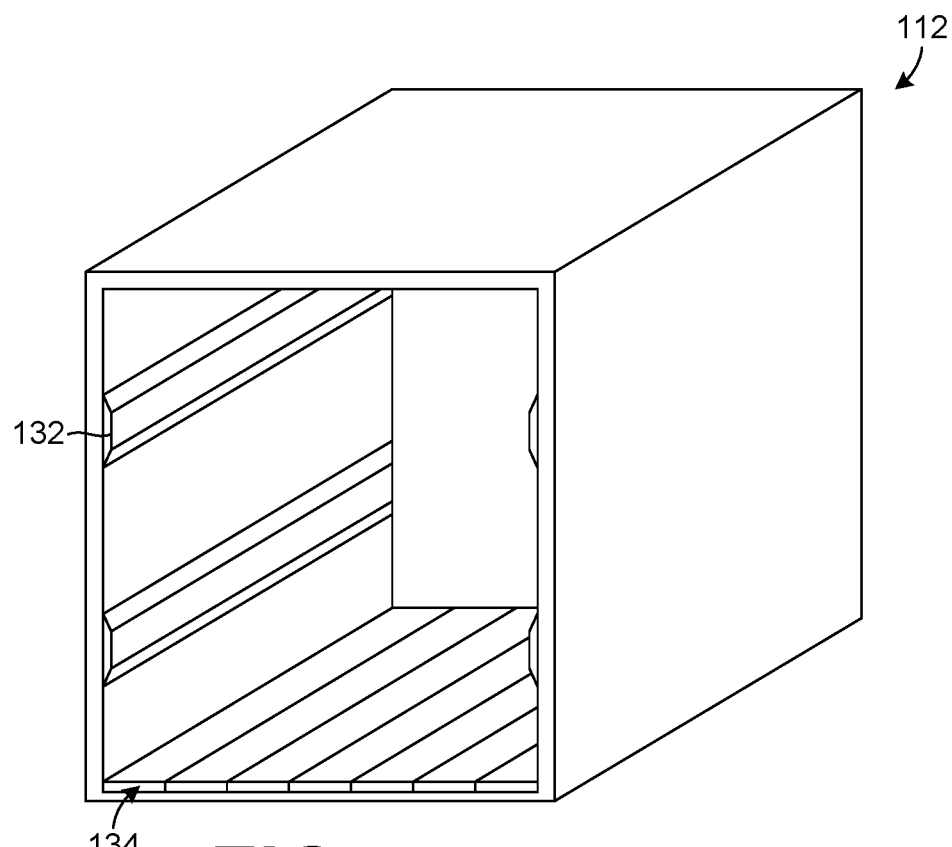
FIG. 4 illustrates an end section of the example trailer.

FIG. 4 shows the section 112, which has an open end after having been sectioned. The panel 120, formed from section 116, can be used to enclose this open end and form an enclosed section 112. The interior of the section 112 can include features found in the interior of the body 110. These features can be retained within, or removed from the section, such as based on the intended use of the completed section. Example features of the section can include rails 132 and a floor 134, these can be retained and used for mounting equipment to the completed unit, providing interior features of the completed unit, or combinations thereof.

Figure 5:
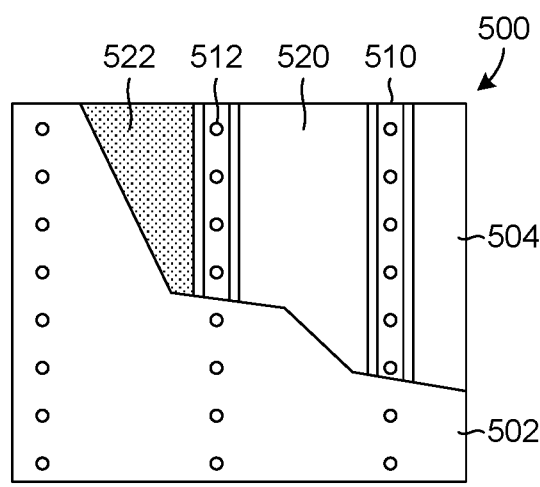
FIG. 5 illustrates an example wall construction of the example trailer.

FIG. 5 is a cross-section of a portion of a wall 500 of the body 110. The wall 500 includes an interior surface 502 that lines the interior of the body 110 and an outer surface 504 that is the external shell of the body 110. Between the inner and outer surfaces, supports or framing 510 can be placed and to which the inner and outer surfaces can be affixed, such as by fasteners 512. The internal framing 510 of the body provides structure and rigidity to the body 110 and the various sections, such as 112, 114, 116, formed therefrom.

The space between the framing 510 can be an air gap 520 or can include insulation 522. Insulated bodies, such as those used for transport of refrigerated/frozen goods, can be sourced and sections cut, or formed, from such a body. The formed sections will also include that insulation, which can provide a climate control benefit to the interior of the section once built out, or completed, for final use. Insulation can also be optionally added to the wall 500 of the section if none is currently present or if there is a desire to supplement existing insulation within the wall 500. Similarly, pre-existing insulation can be removed if so desired.

The interior surface 502, the exterior surface 504, or both can be retained or replaced as part of completing a section for an intended use. Alternatively, additional materials can be overlaid on the interior surface, exterior surface 504, or both, such as to provide additional structure, function, aesthetics, or combinations thereof for the completed section. In an example, sheet metal can be overlaid on the interior surface 502 to provide fire/heat protection, for hygiene/cleaning purposes, or both. Other materials that can replace or overlay the existing interior and exterior surfaces can include polycarbonates, plastic composite, ceramics, metals, other materials, or combinations thereof. The selection of one or more materials can be based on the use of the completed section, aesthetics/preference, other reasons for selection, or combinations thereof.

Figure 6A:
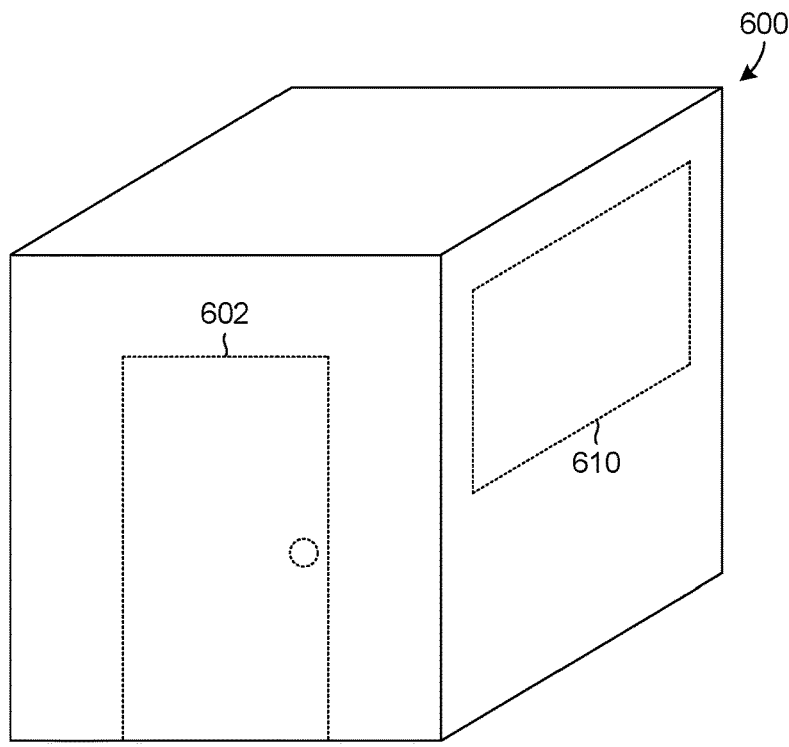
FIGS. 6A-6B illustrate an example structure formed from a section of the example trailer.

FIG. 6A shows an isometric view of an example entry side of an example completed section 600 that can include an opening, such as door/doorway 602, to serve as an entrance and exit to the completed and enclosed section 600. Additionally, an opening 610 can be formed on a side of the section 600, such as to act as an opening through which business can be conducted between a person(s) inside the section 600 and a person(s) outside the section 600. A counter or ledge can also be affixed to the exterior of the section 600, such as below the opening 610, to allow items to be placed thereon. In one example, the counter or ledge can be formed from a panel or piece of the remaining section(s). Other openings, such as to allow utilities to pass through the walls of the section 600, can be formed in/on the section 600.

Prior to enclosing the section 600, such as by a panel formed from another section from the same or another trailer body, various equipment, machinery, fixtures, other items, or combinations thereof can be affixed or placed within the section 600. Installation of interior fixtures/equipment can be more easily accomplished prior to enclosure of the section 600 since an entire side of the section will be open. Once these fixtures/equipment is installed or placed within the section 600, the section 600 can be enclosed. Alternatively, the section 600 can be enclosed and the fixtures/equipment can be installed later, such as providing the completed section 600 to a customer who will be responsible for equipping the section 600 for their own needs.

The completed section 600 can include various environmental features, such as being substantially weatherproof, having ventilation, heating/cooling, environmental features/structures, or combinations thereof. These environmental features/structures can be required, desired, or both for operation of a business, such as a food service business, from the section 600.

Additionally, the completed section 600 can be mounted/placed on a trailer/vehicle, have wheels affixed thereto, or both, to allow the section 600 to be moved about. The transportability of the completed section 600 can be permanent, allowing the section to be moved about, or can be temporary, such as allowing the section to be transported to a permanent/semi-permanent location. Optionally, to assist with the transport of the section 600, elements of the trailer 100, such as the wheel assembly 102, can be used whole or in part. For example, the section 600 can be placed on/affixed to the wheel assembly 102 to allow the section 600 to be moved to a location and once at the location, the wheel assembly 102 can be removed and the section 600 can be placed at the location.

The section 600 can include an awning above the opening 610. The awning can be permanently attached to the section 600 (e.g., such as by welding) or removably attached to the section 600 (i.e., capable of being removed). The awning can have a fixed angle or can have varying angles. In one example, the awning can be formed from another piece or section of the trailer body.

Figure 6B:
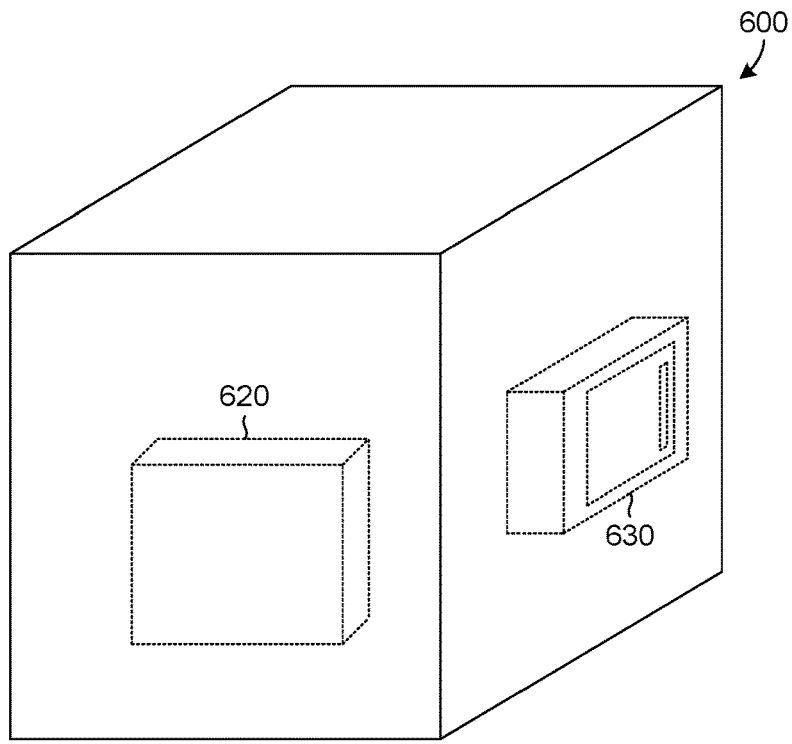

FIG. 6B shows an isometric view of an example side opposite the entry side of an example completed section 600 that can include one or more utility fixtures, such as a water tank 620, an electrical box 630, a water pump, a generator, a battery, a junction box, a grease trap, an exhaust vent, an exhaust fan, a waste container, gas tank, or the like. In one example, the one or more utility fixtures are the sources of the utility. In other words, the one or utility fixtures provide the water, electricity, gas (e.g., propane), and the like. In another example, the one or more utility fixtures connect to one or more utility sources which are not a component of the section 600. In other words, one or more fixtures acts as intermediaries through which the utilities provided by other sources pass (e.g., a water pump connects to a water source to provide water to the section 600; an electrical junction box connects to a generator or power source to provide power to the section 600; a gas manifold or input connects to a gas source to provide gas to the section 600; a grease trap or filter connects to a sewer or waste disposal system). In yet another example, at least one utility fixture is the source of the utility and at least one utility fixture connects to at least one utility source (e.g., a water tank provides water to the section 600 and an electrical junction box connects to an external power source to provide power to the section 600).

The utilities provided by the one or more utility fixtures—whether producing the utility or being connected to a source providing the utility—can be introduced the necessary devices, components, equipment, or structures of the section 600 directly or by conduits, wiring, plumbing, or the like. The section 600 can include switches, toggles, valves, or the like to turn the utilities on and off within the section 600.

The section 600 can also include or be outfitted for one or more emergency system, such as a fire suppression system (e.g., an Ansul system, a fire extinguisher, sprinklers, or the like), a fire detector, a carbon monoxide detector, or the like. The section 600 can also include a shutoff switch or valve for one or more devices or equipment. The section 600 can also include one or more crossbars to which devices or equipment can be anchored to prevent undesired movement or shifting, such as for devices or equipment not built into the section 600.

Figure 7:
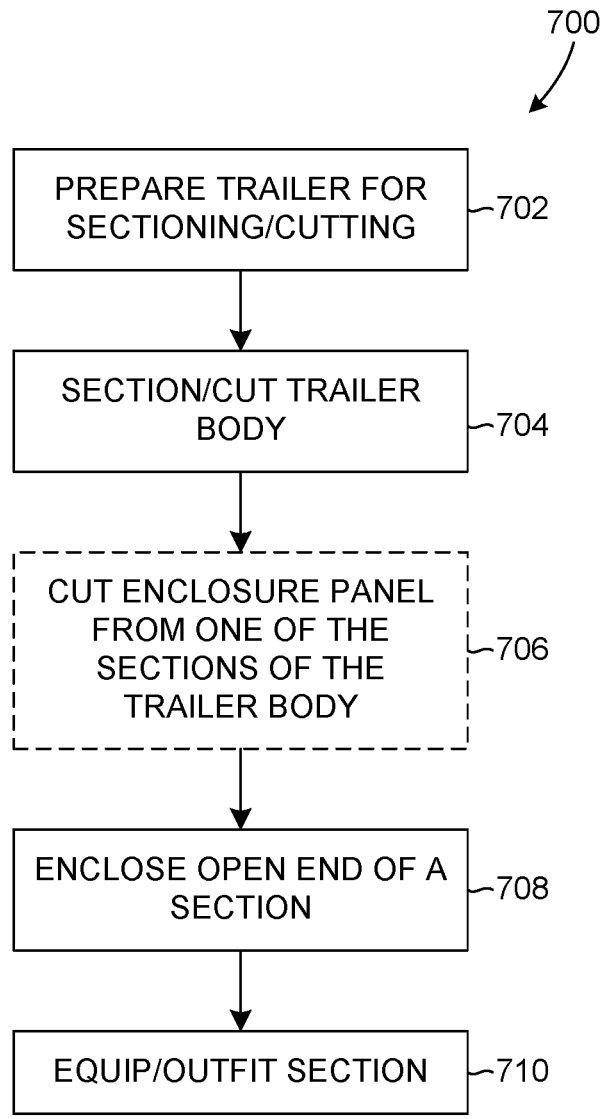
FIG. 7 is an example process of construction a structure from a trailer.

FIG. 7 is an example process 700 for creating an enclosed section from a trailer, such as a semi-truck trailer. At 702, the trailer is prepared for separating (e.g., cutting/sectioning, including water cutting, laser cutting, pneumatic cutting, hydraulic cutting, mechanical cutting, the like, or combinations thereof). The preparation can include removing other elements of the trailer from the trailer body, such as a frame, wheel assembly(s), other elements, or combinations thereof. Once the body is separated from the other components, the trailer body can be sectioned/cut at 704. The number of sections formed from the trailer body can be based on the desired length of a completed section(s) and the overall length of the trailer body. The sections that include an end of the trailer body, such as the front or rear of the trailer body, will have a single side that is open and sections from the middle of the trailer body will have two opposing open ends.

Material will be required to enclose the open end(s) of one or more of the sections formed from the trailer body. Optionally, this material can come from one of the sections, such as at 706 where one or more enclosure panels are cut from a section of the trailer body. In an example, a middle section of the trailer body, a section having two open ends, can have its sidewalls cut out and used as the material to enclose another section of the trailer body. At 708, the open end of a section of the trailer body is enclosed to complete the section. Once the section is enclosed, a self-supporting, enclosed structure is formed, constructed from various elements of the trailer body.

Prior to, or after enclosure of the section, the section can be equipped/outfitted at 710. Equipping/outfitting the section can include installation/placement of fixtures, equipment, other items, or combinations thereof within the section. The one or more items installed/placed within the enclosed section can be based on the intended use of the section, such as restaurant equipment for a section intended for food service. The equipping/outfitting can be performed by the manufacturer/producer of the section, an end-user or other person/entity.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing the invention in diverse forms thereof.

What is claimed is:

1. A method for making a structure, the method comprising:
   separating a trailer body having a unibody construction into at least two sections including:
      a structure body having at least one open end, and
      a remaining section;
   closing the at least one open end of the structure body; and
   equipping the structure body with a fixture, a piece of equipment, or a combination of the fixture and the piece of equipment.

2. The method of claim 1, wherein the at least one open end of the structure body is closed with at least one panel obtained from the remaining section.

3. The method of claim 1, wherein the trailer body is a semi-truck, a dry-van, or a trailer.

4. The method of claim 1, wherein the trailer body is self-supporting.

5. The method of claim 1, wherein the structure body, during the equipping step, is outfitted with a piece of cooking equipment, a piece of food preparation equipment, or a combination of the piece of cooking equipment and the piece of food preparation equipment.

6. The method of claim 5, wherein the equipping step is performed before the closing step.

7. The method of claim 5, wherein the cooking or food preparation equipment is an oven, a microwave, a refrigerator, a freezer, a warm bain marie, a cold bain marie, an electric warming table, or a water bath warming table.

8. The method of claim 1, further comprising forming a first opening on a first side of the structure.

9. The method of claim 8, wherein the first opening is a window, a doorway, or a passage for one or more utilities.

10. The method of claim 9, wherein the one or more utilities are provided by a utility fixture element, and wherein the utility fixture element directly provides the utility or acts as an intermediary.

11. The method of claim 10, wherein the utility fixture element is a water tank, an electrical box, a water pump, a generator, a battery, a junction box, a grease trap, an exhaust vent, an exhaust fan, a waste container, or a gas tank.

12. The method of claim 8, further comprising a second opening on a second side of the structure.

13. The method of claim 12, wherein the first opening is a window, a doorway, or a passage for a utility, and wherein the second opening is the window, the doorway, or the passage for another utility that differs from the utility of the first opening.

14. The method of claim 12, further comprising a third opening on the structure.

15. The method of claim 14, wherein the first, second, and third openings are each one of a window, a doorway, and a passage, respectively, of a first utility; and wherein the second opening and the third opening are the window, the doorway, or the passage for a second utility and a third utility, respectively, each of the second utility and third utility differing from the first utility.

16. The method of claim 1, wherein the structure is permanently or temporarily mounted to a transport.

17. The method of claim 16, wherein the transport is a trailer or a frame and wheel set.

18. The method of claim 16, wherein the transport is a vehicle.

19. The method of claim 1, wherein the structure is formed by a plurality of walls, and wherein at least one of the plurality of walls comprises an interior surface, an exterior surface, or a combination thereof.

20. The method of claim 19, wherein at least one of the plurality of walls includes insulation, an air gap, a fastener, or a support.

21. The method of claim 1, wherein the separating step is performed by cutting.

* * * * *